United States Patent [19]

Hilterhaus et al.

[11] 4,136,238
[45] Jan. 23, 1979

[54] NON-FLAMMABLE AND OPTIONALLY ELECTRICALLY CONDUCTIVE ORGANO-SILICATE POLYMERS AND PROCESS FOR PREPARING SAME

[75] Inventors: Karl H. Hilterhaus, Georgsmarien-hutte, Oesede; Franz G. Reuter, Lemforde; Tankred Menzel, Bad Essen, all of Germany

[73] Assignees: Metallgesellschaft A.G.; Reuter Technologie GmbH; Chemie-Anlagenbau Bischofsheim GmbH, all of Germany

[21] Appl. No.: 637,674

[22] Filed: Dec. 4, 1975

[30] Foreign Application Priority Data

Dec. 21, 1974 [DE] Fed. Rep. of Germany ....... 2460834
Apr. 24, 1975 [DE] Fed. Rep. of Germany ....... 2518192
Jun. 25, 1975 [DE] Fed. Rep. of Germany ....... 2528215

[51] Int. Cl.² .............................................. C08J 9/00
[52] U.S. Cl. .................................. 521/107; 521/100; 521/116; 521/118; 521/122; 521/137; 521/154
[58] Field of Search ..................... 260/2.5 AK, 2.5 AJ, 260/2.5 AM, 2.5 AW

[56] References Cited

U.S. PATENT DOCUMENTS

| 3,607,794 | 9/1971 | Abbotson | 260/77.5 R |
| 3,634,342 | 1/1972 | Boblitt | 260/2.5 |
| 3,756,992 | 9/1973 | Dieterich | 260/77.5 AM |
| 3,981,831 | 9/1976 | Markusch | 260/2.5 AK |
| 3,983,081 | 9/1976 | Dieterich | 260/2.5 AK |
| 4,042,536 | 8/1977 | Dieterich | 260/2.5 AM |
| 4,057,519 | 11/1977 | Summers | 260/2.5 AK |

FOREIGN PATENT DOCUMENTS 2325090 11/1974 Fed. Rep. of Germany.
1137465 7/1967 United Kingdom ............. 260/2.5 AK

OTHER PUBLICATIONS

Rose, *The Condensed Chemical Dictionary*, 5th Edition; Reinhold Pub. Corp., N.Y. 1956; pp. 1012 and 1168.

*Primary Examiner*—C. Warren Ivy
*Attorney, Agent, or Firm*—Larson, Taylor and Hinds

[57] ABSTRACT

This invention relates to a process for preparing organosilicate polymers by reaction of a water glass solution with a compound having at least two isocyanate groups. The reaction is carried out in the presence of a zwitterion compound acting as catalyst and optionally in the presence of propellants and/or water glass hardening agents, the zwitterion compound having in the molecule at least one group with positive charge, at least one group with negative charge, and additionally at least one hydrogen atom with Zerewitinov activity.

18 Claims, No Drawings

NON-FLAMMABLE AND OPTIONALLY ELECTRICALLY CONDUCTIVE ORGANO-SILICATE POLYMERS AND PROCESS FOR PREPARING SAME

All sorts of processes for preparing homogeneous and foamed synthetic resins containing mineral fillers have become known which additionally may contain flame-retardant additives. Although it is possible in this way to prepare synthetic resins with flameretardant characteristics, these foamed synthetic resins do not meet fire prevention regulations in many instances. Moreover, these synthetic resins are relatively expensive so that there is, for example, a genuine demand for foams that are non-flammable, which can be prepared at low cost, and exhibit the desired physical data, especially regarding the resistance to pressure at various densities.

Therefore, it has been the object of the invention to provide such non-flammable homogeneous and foamed synthetic resins and a process for preparing same.

This object has been realized by reacting a water glass solution, especially an aqueous sodium and/or potassium silicate solution, with a compound containing at least two isocyanate groups in the presence of a special catalyst.

Therefore, the subject matter of the invention are non-flammable organosilicate polymers which substantially consist of the reaction product of water glass and a compound containing at least two isocyanate groups, and a process for preparing these polymers. The process of the invention for preparing the non-flammable organomineral foams is characterized in that a water glass solution is reacted with a compound having at least two isocyanate groups in the presence of one or more catalysts and one or more volatile substances as propellants.

In the process of the invention all the types of water glass that are in solution may be employed, e.g. the aqueous solutions of sodium and potassium silicates of 28 to 60° Bé having a molar ratio of $Na_2O : SiO_2$ or $K_2O : SiO_2$ of 1 to 4, and a dry solids content of 35 to 60% by weight. The densities of the water glass solutions are being traditionally stated in degrees Baume.

The water glass solutions preferred according to the invention are colorless, clear as water, and more or less viscous aqueous solutions of sodium and/or potassium silicates with a proportion of $SiO_2$ to $Me_2O \geq 2$. The viscosity rises with the concentration and, with equal silicic acid content, with the ratio. After a critical concentration is reached, the viscosity increases with the ratio. For each ratio there is a maximum concentration above which the solution is too viscous or instable for industrial handling.

In the water glass solutions the presence of Me-, $OH^-$—, and $H_3SiO_4^-$ ions besides $H_4SiO_4$ molecules must be assumed. The crosslinkage of the $H_4SiO_4$ molecules to linear chains and three-dimensional networks takes place with the evolution of water and is responsible for the viscosity of the water glass solutions.

In the presence of air the highly alkaline water glass solutions gradually decompose because the carbon dioxide in the air forms soda ($Na_2CO_3$) so that silicic acid is set free. Suitably the water glass solutions are therefore stored in the absence of air. A corresponding gel-like deposition of silicic acid is obtained when a minor amount of other acid is added to the water glass solution, e.g. hydrochloric acid.

Water glass solutions which are employed according to the invention include, inter alia, the commercially available sodium and potassium silicate solutions apparent from the following compilation. In lieu of the conventional water glass solutions also all the other silicate solutions and/or silicic acid solutions may be used. The same applies to other finely dispersed silicates (colloids)

| | ° Bé | $Na_2O$ % by Weight | $K_2O$ | $SiO_2$ % by Wt | pH 20° | Viscosity cp., 20° C. |
|---|---|---|---|---|---|---|
| Silicic Acid Water Glass 37 to 40° Bé (German) | 35 | 7.0 | — | 26.1 | 10.8 | ~ 200 |
| Water Glass 41 ° Bé (U.S.) | 38 | 7.7 | — | 25.8 | 11.2 | ~ 60 |
| Alkaline Sodium Silicate Solution | 41 | 9.0 | — | 28.7 | 11.3 | ~ 200 |
| 58 to 60° Bé Potassium Silicate Solution, | 59 | 18.0 | — | 36.0 | 12.2 | ~ 60000 |
| 58–60° Bé Potassium Silicate Solution, 41° Bé | 30 | — | 8.2 | 21.2 | 11.3 | ~ 50 |
| | 41 | — | 12.8 | 26.9 | 11.6 | ~ 1000 (25°) |

Since the solutions are to be processed on the equipment conventional in the polyurethane chemistry, and with said equipment solutions up to 1500 centipoises are preferably processed, the above obtainable solutions are mixed either with the additives which will be listed further below or with high viscosity polyesters or polyethers to increase the viscosity, or with water to lower the viscosity.

The isocyanates employed according to the invention include isocyanate compounds having at least two isocyanate groups. According to the invention isocyanate mixtures are preferred which contain predominantly polyisocyanate compounds having at least three isocyanate groups. Examples therefor are the isocyanates commercially available by the registered trademarks "Desmodur 44 V" and "PAPI". The especially preferred polyisocyanate mixtures are mixtures of polyisocyanates containing substantially no diisocyanates and monoisocyanates, and are obtained by a process for the separation of an organic polysocyanate mixture which contains, in preponderant amount, the diphenylmethane-diisocyanate isomers and higher functional polyisocyanates with more than two benzene rings in the molecule, characterised in that first the organic polyisocyanate mixture is separated by a short-path distillation into a fraction 1, which besides a residue of diphenylmethane diisocyanate isomers, contains the higher functional polyisocyanates with more than two benzene rings in the molecule, and into a fraction 2, which, of the polyisocyanates, contains practically only the diphenyl-methane-diisocyanate isomers, and then the fraction 2 is separated by fractional crystallisation into the fraction 3, which preferably has a content of at least 98% 4,4'-diphenyl-methane-diisocyanate, and the fraction 4, in which the 2,2'-and 2,4'-isomers of the diphenyl-methane-diisocyanate are enriched in the 4,4'-diphenyl-methane-diisocyanate.

In this process an organic polyisocyanate mixture obtained by phosgenation of crude aniline/formaldehyde resins which contains predominantly the diphenylmethane diisocyanate isomers and multi-fractional polyisocyanates having more than two benzene rings in the molecule is separated into diphenylmethane diisocyanate isomers and the multi-functional polyisocyanates.

For the preparation of the NCO pre-adducts it is possible to use any suitable organic diisocyanate, for example aliphatic diisocyanates, aromatic diisocyanates, alicyclic diisocyanates and heterocyclic diisocyanates, for example methylene diisocyanate, ethylene diisocyanate, propylene diisocyanate, butylene diisocyanate, cyclohexylene 1,4-diisocyanate, cyclohexylene 1,2-diisocyanate, tetra- or hexamethylene diisocyanate, arylene diisocyanates or their alkylation products, such as phenylene diisocyanates, naphthylene diisocyanates, diphenylmethane diisocyanates, toluylene diisocyanates, di- or triisopropylbenzene diisocyanates; aralkyl diisocyanates such as xylylene diisocyanates, fluoro-substituted isocyanates, ethyleneglycol diphenylether-2,2'-diisocyanate, naphthalene-1,4-diisocyanate, naphthalene-1,1'-diisocyanate, biphenyl-2,4'-diisocyanate, biphenyl-4,4'-diisocyanate, benzophenone-3,3-diisocyanate, fluorene-2,7-diisocyanate, anthraquinone-2,6-diisocyanate, pyrene-3,8-diisocyanate, chrysene-2,8-diisocyanate, 3'-methoxyhexane diisocyanate, octane diisocyanate, ωω'-diisocyanate-1,4-diethylbenzene, ω,ω'-diisocyanate-1,4-dimethylnaphthalene, cyclohexane-1,3-diisocyanate, 1-isopropylbenzene-2,4-diisocyanate, 1-chlorobenzene-2,4-diisocyanate, 1-fluorobenzene-2,4-diisocyanate, 1-nitrobenzene-2,4-diisocyanate, 1-chloro-4-methoxybenzene-2,5-diisocyanate, benzeneazonaphthalene-4,4'-diisocyanate, diphenylether-2,4-diisocyanate, diphenylether-4,4-diisocyanate, as well as polyisocyanates containing isocyanurate groups.

Diisocyanates which are preferably used according to the invention are: 4,4'-diphenylmethane diisocyanate and/or its 2,4- and/or its 2,2'-isomers, 1,6-hexamethylene diisocyanate, 2,4-toluylene and/or 2,5-toluylene diisocyanate and m-xylylene diisocyanate.

According to the invention also the NCO pre-adducts used in the preparation of polyurethanes may be employed, of course. The NCO pre-adducts used according to the invention are higher molecular weight compounds with two terminal NCO groups which preferably possess a molecular weight of 500 to 10,000, especially between 800 and 2500. Preferably the NCO pre-adducts have a content of NCO groups of 1.5 to 5%. The preparation of these NCO pre-adducts is carried out in a known manner by reacting higher molecular weight compounds containing OH groups with an excess of polyisocyanate. The preparation of such NCO pre-adducts is described, for example, in Angewandte Chemie 64, 523 to 531 (1952); Kunststoffe 42, 303 to 310 (1952); German Pat. No. 831,772; German Pat. No. 897,014; German Pat. No. 929,507; and U.S. Pat. No. 3,000,757.

Higher molecular weight compounds containing OH groups which are suitable for the production of the NCO pre-adducts are, for example, polyesters, polyethers, polyesteramides, polythioethers and polyacetals.

As polyols for the preparation of the NCO pre-adducts one may use, for example, linear hydroxyl polyesters which contain primary and/or secondary and/or tertiary hydroxyl groups and which have been obtained either by polycondensation of ε-caprolactone or 6-hydroxycaproic acid or by copolymerization of ε-caprolactone with dihydric alcohols or by polycondensation of dicarboxylic acids with dihydric alcohols.

The hydroxyl polyesters used for the preparation of the NCO preadducts may also be prepared from dicarboxylic acids or mixtures of dicarboxylic acids with dihydric alcohols. Suitable dicarboxylic acids include, for example, adipic, succinic, suberic, sebacic, oxalic, methyladipic, glutaric, pimelic, azelaic, phthalic, terephthalic, isophthalic, maleic, fumaric, citraconic, itaconic acid. Suitable dihydric alcohols or their mixtures that are reacted with the dicarboxylic acids or the ε-caprolactone to the desired hydroxypolyesters include, for instance, ethylene glycol, propylene glycol, butylene glycols, e.g. 1,4-butanediol, butenediol, butinediol, bis(hydroxymethylcyclohexane), diethylene glycol, 2,2-dimethylpropylene glycol, 1,3-propylene glycol.

The polyols preferably used for the preparation of the NCO pre-adducts include polyesters on the basis of adipic acid, 1,6-hexanediol, and neopentyl glycol having an average molecular weight of about 2000 (Polyol 2002 manufactured by Polyol-Chemie, Osnabruck; hydroxyl number 56, acid number 1), polyesters on the basis of polycarprolactone having an average molecular weight of 2000 (Niax Polyol D 560 manufactured by Union Carbide Corp.) and polyethers commercially available from BASF under the tradename "Polyol PTMG" and having an average molecular weight of 2000.

Furthermore, high molecular weight compounds having terminal carboxyl, amino and mercapto groups are suitable, and so are polysiloxanes containing groups reactive toward isocyanates. Additional useful compounds are described, for instance, by J.H.Saunders, K.C.Frisch in "Polyurethanes", Part 1, New York 1962, pages 33 to 61 and in the literature listed there.

For the preparation of the NCO pre-adducts any suitable organic diisocyanate may be employed, e.g. the above mentioned diisocyanates.

NCO pre-adducts with terminal isocyanate groups having carbon-to-carbon double bonds are easily obtainable by using in the preparation of the NCO pre-adduct exclusively or partially unsaturated polyesters, for instance.

Isocyanate compounds useful for the purposes of the invention and having groups that are either ionic and/or behave like ionic groups in the alkaline reaction mixture, and the likewise useful polymerizable compounds, are described, for instance, in the published German patent applications(DOS) Nos. 23 59 606, 23 59 608, 23 59 609, 23 59 610, 23 59 612, 23 10 559, 22 27 147 and 17 70 384. Preferably the isocyanate compounds are employed which are halogenated, especially chlorinated, and/or sulfonated. The above mentioned published German applications partially also list isocyanate compounds that do not have ionic groups. These compounds are likewise suited for the purposes of the invention.

It has been found that as catalysts generally compounds are suited which may be designated as zwitterion compounds, i.e. compounds having in the molecule at least one group with positive charge and at least one group with negative charge and which preferably additionally have a hydrogen atom with Zerewitinov activity. The compounds of this group that are preferably used include compounds of the general formula

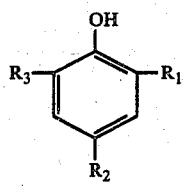

wherein the radicals $R_1$, $R_2$ and $R_3$ are hydrogen atoms or a radical of the general formula

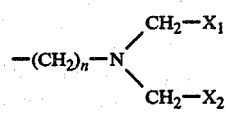

wherein n is an integer from 1 to 25 and the radicals $X_1$ and $X_2$ stand for hydrogen atoms and/or alkyl radicals with 1 to 25 carbon atoms, the radicals $R_1$, $R_2$ and $R_3$ may be different from one another, not more than two of the radicals $R_1$, $R_2$ or $R_3$ may be hydrogen atoms, and the alkyl radicals may have primary and/or secondary hydroxyl groups.

Especially preferred are tertiary amino compounds having a phenolic hydroxyl group which additionally contain at least one hydroxyl group, i.e. tertiary amino compounds of the general formula

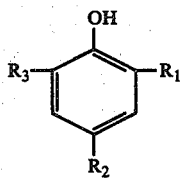

wherein the radicals $R_1$, $R_2$ and $R_3$ stand for hydrogen atoms or a radical of the general formula

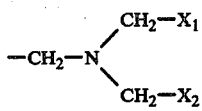

wherein the radicals $X_1$ and/or $X_2$ are hydrogen atoms, alkyl radicals with 1 to 25 carbon atoms or the radical —$(CH_2)_n$OH (n being an integer from 0 to 25); at best two of the radicals $R_1$, $R_2$ or $R_3$ may be hydrogen atoms, and at least one of the radicals $R_1$, $R_2$, $R_3$ must bear a hydroxyl group.

Tertiary amino compounds with zwitterion characteristics that are preferably used according to the invention and correspond to the above general formula are 2,4,6-tris(ethyl-2-hydroxyethylaminomethane)phenol of the formula

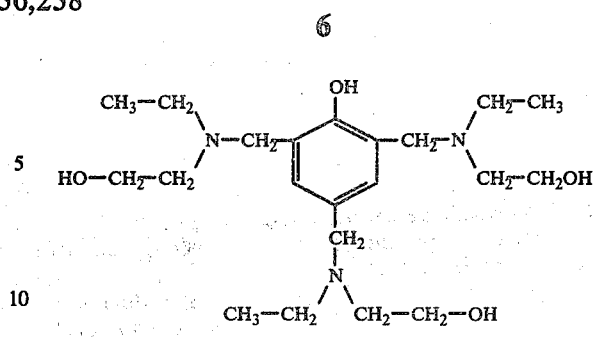

and 2,4,6-tris(dimethylaminomethyl)phenol.

Moreover, in addition to the above mentioned catalysts organometal compounds may be used as co-catalysts. Examples therefor are dibutyltin dilaurate, dibutyltin diacetate, stannous octoate, dibutyltin diocto-ate, and di-n-butyltin carboxylate.

Preferably metal ions and/or complexes thereof are used to stabilize the reaction mixture.

Suitable complex forming agents used according to the invention are especially compounds capable of forming five-membered and six-membered rings. Five-membered rings are formed, for instance, when two adjacent OH groups are present in the complexing agent as, for instance, in the glycols, triols and sugar alcohols. Moreover, also the oxalato, glycino and ethylenediamino tetraacetic acid complexes are useful.

Six-membered rings re formed when the complexing agent contains double bonds. These include, for instance, acetyl acetonato and salicylato complexes.

Furthermore, quadridental ligands may be used which form both six-membered and five-membered rings. An example therefor is the bis-(acetylacetone)ethylene diimine complex. Hence, complexes are preferred which are outwardly electrically neutral on account of the lack of an ion.

Among the organic complexing agents polyols are preferred which have at least two adjacent hydroxyl groups or in which at best one further carbon atom is positioned between the carbon atoms bearing the hydroxyl groups. Suitable compounds of this type include, for instance, ethylene glycol, glycerol, mannitol, 1,2-dioxypropane, phenylglycol, catechol, monoethers of glycerol, 2,3-naphthalenediol, 1,8-naphthalenediol, and 2-chloro-4-(1,1,3,3-tetramethylbutyl)-6-hydroxymethyl phenol.

In lieu of or together with the above described isocyanates thioisocyanates having at least two isocyanate or thioisocyanate groups, thiocyanates, selenium cyanates, and tellurium cyanates or other polymerizable compounds may be used.

According to the invention, it has been further found that it is favorable to carry out the reaction in the additional presence of a compound acting as hardening agent and lowering the pH of the reaction mixture. Suitable compounds of this type include, depending on the reaction mixture employed, ammonium chloride, barium chloride, barium nitrate, bleaching earths, disodium phosphate, calcium-magnesium carbonate, calcium bromide, calcium chloride, calcium iodate, potash alum, potassium fluoride, potassium borofluoride, potassium bromide, potassium carbonate, potassium metabisulfite, potassium silicofluoride, magnesium carbonate, magnesium fluoride, magnesium oxide, magnesium phosphate, monoammonium phosphate, monosodium phosphate, sodium antimonate, sodium acetate, sodium bichromate, sodium bifluoride, sodium bisulfate, sodium bromide, sodium fluoride, sodium hexametaphosphate, tetrapotassium pyrophosphate, zinc acetate, zinc carbonate, and boric acid.

In the preparation of foams according to the process of the invention preferably propellant is additionally used, especially inert liquids which boil between −25 and +50° C., preferably between −15 and +40° C. These are especially alkanes, alkenes, halo-substituted alkanes or alkenes, or dialkyl ethers. Such substances are, for instance, saturated or unsaturated hydrocarbons having from 4 to 5 carbon atoms, such as isobutylene, butadiene, isoprene, butane, pentane, petroleum ether, halogenated saturated or unsaturated hydrocarbons such as chloromethyl, methylene chloride, fluorotrichloromethane, difluorodichloromethane, trifluorochloromethane, chloroethane, vinyl chloride, vinylidene chloride. Trichlorofluoromethane, vinyl chloride, and $C_4$ hydrocarbons such as butane, monofluorotrichloromethane (commercially available by the registered trademarks Frigen 11 and Kaltron 11), dichlorodifluoromethane and trichlorotrifluoroethane have proved to be most suitable. Monofluorotrichloromethane is preferred. As additional propellant air may be stirred into the composition.

Of course, in the preparation of the foam at elevated temperature also higher-boiling propellants may be used as additives, e.g. hexane, dichloroethane, trichloroethane, carbon tetrachloride, light gasoline. Also the water present in the mixture may act as propellant. Furthermore, fine metallic powders, e.g. calcium, magnesium, aluminum or zinc, may serve as propellants by the evolution of hydrogen; at the same time they have a hardening and reinforcing effect.

The propellants are used in quantities from 0 to 50% by weight, preferably 2 to 30% by weight, based on the reaction mixture.

In lieu of the above mentioned volatile propellants also gas-evolving compounds may be advantageously used according to the invention. Such propellants include, for instance, bicarbonates, e.g. sodium bicarbonate; ammonium carbonate or ammonium nitrite; or an organic nitrogen compound which gives off nitrogen when heated, e.g. dinitrosepentamethylene diamine, barium azodicarboxylate, azodicarboxylic acid amide, substituted triazole, diphenylsulfone-3,3'-disulfone hydrazide or azoisobutyric acid dinitrite. Optionally these propellants may be used together in a compound lowering the decomposition temperature. Especially interesting possibilities are opened up by the preparation of the foams of the invention with the use of compounds evolving $CO_2$ which perform a dual function. Once $CO_2$ has been evolved, it effects both blowing and precipitation of the water glass. Of course, these gas-evolving compounds may be used also in mixture with volatile compounds acting as propellants (e.g. the fluorinated hydrocarbons).

In order to form an especially fine cellular structure it is advisable to admix nucleating and cell-regulating substances. Many compounds are suited as nucleating substances, e.g. finely divided inert solids, such as silica or alumina, optionally together with zinc stearate, or amorphous silicic acids or metal silicates. Among these the silica precipitating from the colloidal solution is preferred as nucleating agent.

Suitable cell-regulating agents include silicone oils on the basis of polysiloxanes, e.g. the products sold by Messrs. Union Carbide Corporation under the designations DC-193, DC-194, DC-195, L-532, L-5340; the products sold by Messrs. General Electric by the designations SF 1066, SF 1109; the DC types sold by Messrs. Wacker; Tegiloxan of Messrs. Goldschmidt; and Emulgin 286 of Messrs. Henkel. Among these DC-195, L-5340 and Emulgin 286 are preferred.

Preferably in the preparation of the foams of the invention also surface-active additives are employed in order to facilitate foaming by the reduction of the surface tension of the system. Moreover, by additional effect on the cell structure they impart to the foams certain desirable properties. Suitable compounds include, for instance, tensides (commercially available by the tradename Emulgin 286 manufactured by Henkel) and the non-ionic alkylphenoloxethylates having an oxethylating degree of about 6 to 20. Emulgin 286 and alkylphenoloxethylates having an oxethylating degree of 9 to 10 are preferred.

The surface-active additives may simultaneously act as foam stabilizers. In addition, silicone oil (commercially available under the designation Si L 5340 and manufactured by Union Carbide Corporation) and Emulgin 286 of Messrs. Henkel may be used as foam stabilizers.

In order to further increase the non-flammability of the homogeneous polymers or the foams of the invention, flame-retardant substances are added to the system. These substances may be either dissolved or dispersed in one or both components. The flame-retardant substances soluble in the aqueous component include, for instance, trisodium phosphate . 12 $H_2O$. The insoluble flame-retardant additives which, incidentally, also perform a reinforcing function include, for instance, kieselguhr (diatomaceous earth), aluminum hydrate, magnesium silicate, asbestos powder, chalk, asbestos fibers, and glass fibers.

Compounds on the basis of phosphorus-halogen are especially suited as organic flame retarding agents, e.g. the compound of the formula

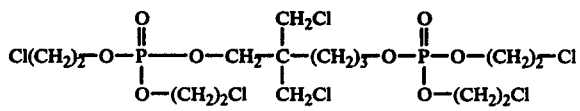

commercially available by the tradename "Phosgard 2XC20" manufactured by Messrs. Monsanto.

This compound contains about 35% chlorine and about 11% phosphorus. It is inert toward NCO groups. The special advantages of this phosphonate ester reside in the circumstance that the viscosity of high viscosity polyisocyanate materials can be considerably lowered by blending with this phosphonate ester, and that the material is emulsifiable in water with suitable emulsifiers. The flame-retardant properties are due not only to the relatively high contents of phosphorus and chlorine but also to the increase of the oxygen index which - when the material is exposed to flames - immediately forms a hard, charred layer which no longer propagates flames. In addition to the flame-retardant properties, the ester has the purpose of neutralizing the alkaline reaction component by the P and Cl atoms. The material is odorless and of low toxicity.

On principle, the polymers of the invention may be filled with considerable amounts of fillers without losing their excellent properties; especially preferred fillers which exert a distinctly reinforcing effect are water-binding (hydraulic) additives of organic or inorganic nature, especially hydraulic cements, synthetic anhydrite, gypsum and burnt lime.

With the use of sufficient amounts of such water-binding additives also aqueous solutions may be used to form xerosol which have a high water content, e.g. 60 to 90%.

As hydraulic cement especially portland cement, quick-setting cement, slag cement, low-temperature fired cement, sulfate-resistant cement, bricklaying cement, natural cement, lime cement, gypsum cement, Puzzolan cement and calcium sulfate cement are being used.

The water-binding additives are used for the production of hard materials, preferably in an amount sufficient to bind 40 to 100% of the water introduced by the aqueous phase. In particular, the amount of water-binding additives is 50 to 400% by weight of the "total mixture" (sum of the two chief components).

Binding of the water introduced by the aqueous phase by hydraulic binders, especially cement, lime or anhydrite, is of essential significance in view of the behavior of the materials in case of fire. Under the influence of heat it is slowly given off endothermically thereby exerting a highly fire retardant effect.

Moreover, also diatomaceous earth is especially well suited for the purposes of the invention, since it also performs several functions simultaneously. By its ability to absorb several times its volume of water it helps to "dry out" the foam without the foam undergoing shrinkage. Moreover, diatomaceous earth is both inert towards acids and toward bases and not flammable. It may be mixed both with the one and with the other component, and owing to its fine distribution in the two components it results in a high increase of the "internal surface area" which has a favorable effect during the production of the foams of the invention in that it exerts an emulsifying effect (formation of protective colloid).

The fillers to be employed and the inert additives may also be impregnated, soaked or sprayed with one of the liquid components of the mixture, e.g. to improve the adhesion or flowability.

The amount of additives employed depends primarily on the viscosity of the mixture. Preferably the amount of additives ranges between 0.1 and 20% by weight, based on the weight of the reaction mixture employed. Besides these flame-retardant additives and fillers it is, of course, also possible to add to the mixture pigments or dyestuffs when colored foams are desired.

Further examples for surface-active additives and foam stabilizers to be optionally co-used according to the invention and cell-regulating agents, reaction inhibitors, stabilizers, flame-retardant substances, plasticizers, dyestuffs and fillers and fungistatically and bacteriostatically active substances, and details about the use and mode of effect of said additives, are described in Kunststoff-Handbuch, Vol. VI, published by Vieweg & Hochtlen, Carl Hanser Verlag Munchen 1966, e.g. on pages 103 to 113.

Depending on the desired properties of the polymers of the invention, polyesters and polyethers may be additionally used as reaction components, as used in the polyurethane chemistry and as partially described above in connection with the preparation of the NCO pre-adducts to be employed according to the invention. Since the polyols, i.e. the polyesters and polyethers, have been amply described in the polyurethane literature, these compounds will not be described in more detail here.

Furthermore, synthetic resin particles, preferably in the form of an aqueous synthetic resin dispersion, may be incorporated into the reaction mixture of the invention. Suitable synthetic resin dispersions include, for instance, dispersions commercially available under the registered trademarks Oppanol and Lutofan (both products manufactured by BASF).

The electrically conductive polymers form a further interesting aspect of the present invention. In the preparation of foams electrically conductive particles are added, further to the already mentioned additives, in amounts such that there results an electrically conductive foam. As electrically conductive particles metal powder, inert particles coated with noble metals, e.g. metallized glass spheres, synthetic resin particles to which electrical conductivity has been imparted, particles of electrically conductive synthetic resins, and the carbon black and graphite materials conventionally used in the production of electrically conductive synthetic resins may be employed. Of course, also mixtures of the above mentioned substances and their aqueous dispersions may be used.

Mixing of the above mentioned components takes place in the way familiar from the polyurethane chemistry. As usual, at first a component A and a component B is prepared which are then blended after the addition of the respective additives and catalysts. The starting period of the thus prepared mixtures for foams generally ranges between 5 and more than 100 seconds and can be regulated at will. Optionally the components may be heated to shorten the starting period. On account of the high specific gravity of water glass the volumetric weight of the resulting organomineral foams is higher by this factor than that of comparable polyurethane foams. Preferably the organomineral foams of the invention have a density between 15 and 750 kg/m$^3$.

The proportion of the solids of the sodium and/or potassium silicate solution to the isocyanate groups employed is within a range of 0.1 to 6, based on the percentage of NCO groups and the dry weight of the water glass. For example, 50 parts by weight of PAPI (28% NCO) and 70 parts by weight of sodium silicate solution (56.4% solids) give a ratio of water glass (dry) to isocyanate groups of 39.5 : 14 = 2.

The following examples explain the invention without constituting a restriction thereof. Values in percent and parts relate to the weight, unless indicated otherwise.

EXAMPLE 1

In a stirred vessel 50 parts by weight of water glass of 48 to 50° Bé and a molar ratio of Na$_2$O : SiO$_2$ = 2.68 are mixed with 1.5 part by weight of 2,4,6-tris(dimethylaminomethyl)phenol until the color markedly changes to yellow.

In a second stirred vessel 50 parts by weight of polyphenolpolymethylene polyisocyanate (PAPI), 1.2 part by weight of silicone oil sold by Messrs. UCC under the designation DC 195, as foam stabilizer, and 10 parts by weight of trichlorofluoromethane are blended.

The two mixtures are stirred together for 10 seconds. A finely porous non-flammable foam is formed which has a density of 34 kg/m$^3$.

EXAMPLE 2

In a stirred vessel 64 parts by weight of water glass of 48 to 50° Bé and a molar ratio of $Na_2O : SiO_2 = 2.68$ are mixed with 2.0 parts by weight of 2,4,6-tris(dimethylaminomethyl)phenol and 7 parts by weight of diatomaceous earth (Celatom MW 31 manufactured by Chemag) until the color of the mixture markedly changes to yellow.

In a second stirred vessel 50 parts by weight of polyphenol-polymethylene polyisocyanate (according to DOS No. 2,105,193), 0.5 part by weight of silicone oil solid by Messrs. UCC under the designation DC 193, as foam stabilizer, and 6 parts by weight of trichlorofluoromethane are blended.

The two mixtures are stirred together for 10 seconds. A finely porous non-flammable foam results which does not smolder or drip and which has a density of 95 kg/m$^3$.

EXAMPLE 3

In a stirred vessel 64 parts by weight of sodium silicate solution of 48 to 50° Bé and a molar ratio of $Na_2O : SiO_2 = 2.68$ are blended with 2.0 parts by weight of 2,4,6-tris(dimethylaminomethyl) phenyl and 22 parts by weight of diatomaceous earth (Celatom MW 31 manufactured by Chemag) until the mixture markedly turns to yellow.

In a second stirred vessel 50 parts by weight of polyphenol-polymethylene polyisocyanate, 0.5 part by weight of silicone oil manufactured by UCC under the designation L-5340, as foam stabilizer, and 8 parts by weight of trichlorofluoromethane are blended.

The two mixtures are stirred together for 10 seconds. A finely porous non-flammable hard foam is obtained which does not smolder or drip and which has a density of 560 kg/m$^3$.

EXAMPLE 4

In a stirred vessel 50 parts by weight of sodium silicate solution of 58 to 60° Bé and a molar ratio of $Na_2O : SiO_2 = 2.17$ are blended with 3.0 parts by weight of 2,4,6-tris(dimethylaminomethyl)phenol until the color markedly turns to yellow.

In a second stirred vessel 50 parts by weight of polyphenol polymethylene polyisocyanate, 1.5 part by weight of silicone oil sold by UCC under the designation DC 195, as foam stabilizer, and 10 parts by weight of trichlorofluoromethane are blended.

The two mixtures are stirred together for 10 seconds. There is obtained a finely porous non-flammable foam having a density of 35 kg/m$^3$.

EXAMPLE 5

In a stirred vessel 49 parts by weight of potassium silicate solution of 28 to 30° Bé are blended with 9.8 parts by weight of Bentone 27* and 1.0 part by weight of an alkylphenoloxethylate having an oxethylating degree of 10 (sold by BASF as Lutensol AP 10).
*Bentone ® = organic montmorillonite derivatives In a second stirred vessel 50 parts by weight of polyphenol-polymethylene polyisocyanate, 1.0 part by weight of silicone oil sold by UCC under the designation L-5340, as foam stabilizer, 9.0 parts by weight of dibutylbenzeneamine, 0.2 part by weight of dibutyltin dilaurate, and 8 parts by weight of trichlorofluoromethane are blended.

The two mixtures are stirred together for 10 seconds. A finely porous non-flammable hard foam of a density of 190 kg/m$^3$ is formed.

EXAMPLE 6

In a stirred vessel 64 parts by weight of sodium silicate solution of 48 to 50° Bé and a molar ratio of $Na_2O : SiO_2 = 2.68$ are blended with 2.0 parts by weight of 2,4,6-tris(dimethylaminomethyl)phenol until a distinct yellow color develops.

In a second stirred vessel 50 parts by weight of a modified liquefied MDI (Desmodur P 90, commercial product of Messrs. Bayer), 0.5 part by weight of silicone oil sold by Messrs. UCC as DC-193, as foam stabilizer, and 6 parts by weight of trichlorofluoromethane are blended.

The two mixtures are stirred together for 10 seconds. A finely porous non-flammable hard foam is formed which has a density of 740 kg/m$^3$.

EXAMPLE 7

In a stirred vessel 50 parts by weight of sodium silicate solution of 58 to 60° Bé and a molar ratio of $Na_2O : SiO_2 = 2.17$ are blended with 1 part by weight of 2,4,6-tris(dimethylaminomethyl)phenol and 3 parts by weight of Emulgin 286 until the mixture perceptibly turns yellow.

In a second stirred vessel 10 parts by weight of toluylene diisocyanate (TDI) and 0.5 part by weight of silicone oil sold by Messrs. UCC under the designation L-5340, as foam stabilizer, are blended.

The two mixtures are stirred together for about 5 seconds. There is formed a white, non-flammable filled foam having a density of 200 kg/m$^3$.

EXAMPLE 8

In a stirred vessel 50 parts by weight of water glass of 48 to 50° Bé and a molar ratio of $Na_2O : SiO_2 = 2.68$ are blended with 3 parts by weight of b 2,4,6-tris(dimethylaminomethyl)phenol and 5 parts by weight of diatomaceous earth (Celatom MW 31 of Messrs. Chemag) until the mixture distinctly assumes a yellow color.

In a second stirred vessel 12 parts by weight of polyphenolpolymethylene polyisocyanate (PAPI), 0.2 part by weight of silicone oil manufactured by Dow Corning under the designation DC 195, as foam stabilizer, 8 parts by weight of trichlorofluoromethane, 10 parts by weight of Phosgard 2XC20, and 15 parts by weight of sodium silicofluoride are blended.

The two mixtures are stirred together in a proportion of 1 : 1 for 20 seconds. There is formed a finely porous non-flammable foam having a density of 80 kg/m$^3$.

EXAMPLE 9

In a stirred vessel 45 parts by weight of water glass of 48 to 50° Bé and a molar ratio of $Na_2O : SiO_2 = 2.68$ are blended with 2.0 parts by weight of 2,4,6-tris(dimethylaminomethyl)phenol until the mixture assumes a yellow color.

In a second stirred vessel 8 parts by weight of polyphenol-polymethylene polyisocyanate (as described in DOS No. 2,105,193), 0.2 part by weight of silicone oil sold by Messrs. Dow Corning under the designation DC-193, as foam stabilizer, 6 parts by weight of acidic phosphate/phosphite salt mixtures (Tresolit CP of Messrs. Henkel) and 6 parts by weight of trichlorofluoromethane are blended.

The two mixtures are stirred together in a proportion of 5 : 3 for 15 seconds. There is formed a finely porous non-flammable foam which does not smolder or drip and which has a density of about 170 kg/m³.

EXAMPLE 10

In a stirred vessel 50 parts by weight of sodium silicate solution of 58 to 60° Bé and a molar ratio of $Na_2O : SiO_2 = 2.17$ are blended with 3.0 parts by weight of 2,4,6-tris(ethyl-2-hydroxyethylaminomethyl)phenol and 5 parts by weight of diatomaceous earth (Celatom MW 31 manufactured by Messrs. Chemag) until the mixture assumes a yellow color.

In a second stirred vessel 12 parts by weight of polyphenol-polymethylene polyisocyanate, 0.5 part by weight of silicone oil of Messrs. Dow Corning designated DC-193, as foam stabilizer, 11 parts by weight of Phosgard 2XC20 (Monsanto), 9 parts by weight of Tresolit CP (Henkel) and 10 parts by weight of trichlorofluoromethane are blended.

The two mixtures are stirred together for 20 seconds. There is obtained a finely porous non-flammable foam having a density of 175 kg/m³.

EXAMPLE 11

In a stirred vessel 50 parts by weight of sodium silicate solution of 58 to 60° Bé are blended with 5 parts by weight of Bentone ® 27 and 3 parts by weight of 2,4,6-tris(dimethylaminomethyl)phenol.

In a second stirred vessel 25 parts by weight of polyphenol-polymethylene polyisocyanate, 0.5 part by weight of silicone oil manufactured by UCC under the designation L-5340, as foam stabilizer, 1 part by weight of sodium bicarbonate, and 2 parts by weight of trichlorofluoromethane are blended.

The two mixtures are stirred together for 15 seconds. There is formed a finely porous non-flammable hard foam having a density of 30 kg/m³.

EXAMPLE 12

In a stirred vessel 25 parts by weight of sodium silicate solution of 58 to 60° Bé and 25 parts by weight of sodium silicate solution of 48 to 50° Bé are blended with 3.0 parts by weight of 2,4,6-tris(dimethylaminomethyl)phenol and 5 parts by weight of diatomaceous earth (Celatom MW 31 of Messrs. Chemag) until the mixture assumes a distinctly yellow color.

In a second stirred vessel 25 parts by weight of a modified liquefied MDI polyisocyanate (Desmodur 44 V-20 sold by Messrs. Bayer), 0.5 part by weight of silicone oil sold by Messrs. Dow Corning as DC-193, as foam stabilizer, and 1 part by weight of sodium bicarbonate are blended.

The two mixtures are stirred together for 25 seconds. There is formed a finely porous non-flammable hard foam having a density of 190 kg/m³.

EXAMPLE 13

In a stirred vessel 60 parts by weight of sodium silicate solution of 48 to 50° Bé and 20 parts by weight of sodium silicate solution of 28 to 30° Be are blended with 2 parts by weight of 2,4,6-tris(dimethylaminomethyl)phenol and 15 parts by weight of conductive carbon black (Corax-L of Messrs. Degussa).

In a second stirred vessel 10 parts by weight of liquefied MDI polyisocyanate (Desmodur 44V-20 of Messrs. Bayer) and 0.5 part by weight of silicone oil sold as L-5340 by UCC, as foam stabilizer, are mixed.

The two mixtures are stirred together for about 10 seconds. There is formed a hard, electrically conductive foam having a density of more than 200 kg/m³.

What we claim is:

1. In a process for preparing organosilicate polymers by reaction of a water glass solution with an isocyanate compound having at least two isocyanate groups, the improvement which comprises admixing with the water glass solutions prior to the introduction of said isocyanate compound into the reaction mixture, a zwitterion compound having in the molecule at least one group with positive charge, at least one group with negative charge, and additionally at least one hydrogen atom with Zerewitinov activity, the zwitterion compound being a tertiary amino compound of the general formula

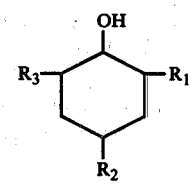

wherein the radicals $R_1$, $R_2$ and $R_3$ stand for hydrogen atoms or a radical of the general formula

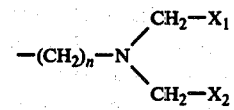

wherein n is an integer from 1 to 25 and the radicals $X_1$ and $X_2$ are hydrogen atoms and/or alkyl radicals with 1 to 25 carbon atoms, the radicals $R_1$, $R_2$ and $R_3$ may be different, at best two of the radicals $R_1$, $R_2$ or $R_3$ may be hydrogen atoms, and the alkyl radicals may bear primary and/or secondary hydroxyl groups.

2. Process according to claim 1 characterized in that the ratio of solids in the water glass solution employed to the isocyanate groups employed is within a range of 0.1 to 6, based on the percentage of NCO groups and the dry weight of the water glass.

3. Process according to claim 1 characterized in that as catalyst a tertiary amino compound of the general formula

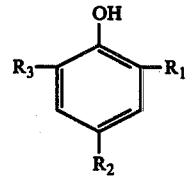

is used wherein the radicals $R_1$, $R_2$ and $R_3$ stand for hydrogen atoms or a radical of the general formula

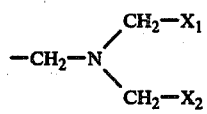

wherein the radicals $X_1$ and/or $X_2$ are hydrogen atoms, alkyl radicals having from 1 to 25 carbon atoms, or the radical $-(CH_2)_m OH$ with m being an integer from 0 to 25, at best two of the radicals $R_1$, $R_2$ or $R_3$ may be hydrogen atoms, and at least one of the radicals $R_1$, $R_2$, $R_3$ must bear a hydroxyl group.

4. Process according to claim 1 characterized in that the reaction is carried out in the presence of 2,4,6-tris(-dimethylaminomethyl)phenol or of 2,4,6-tris(ethyl-2-hydroxy-ethyl-aminomethyl)phenol and optionally dibutyltin dilaurate.

5. Process according to claim 1 characterized in that the reaction is carried out in the additional presence of a compound acting as water glass hardening agent and lowering the pH of the reaction mixture.

6. Process according to claim 5 characterized in that the water glass hardening agent is a metal silicofluoride.

7. Process according to claim 1 characterized in that the reaction is carried out in the presence of one or more emulsifiers.

8. Process according to claim 1 characterized in that the reaction is carried out in the presence of volatile propellants.

9. Process according to claim 1 characterized in that the reaction is carried out in the presence of gas-evolving propellants.

10. Process according to claim 1 characterized in that the reaction is carried out in the additional presence of flame retarding agents, especially in the presence of halogenated phosphoric acid esters.

11. Process according to claim 1 characterized in that the reaction is carried out in the presence of fillers and/or pigments.

12. Process according to claim 11 characterized in that diatomaceous earth is used as filler.

13. Process according to claim 1 characterized in that the reaction is carried out in the presence of a polyester and/or polyether.

14. Process according to claim 1 characterized in that the isocyanate component is a mixture of polyisocyanates containing substantially no diisocyanates and monoisocyanates and wherein said mixture is the fraction 1 obtained by the process for the separation of an organic polyisocyanate mixture which contains, in preponderant amount, the diphenyl-methane-diisocyanate isomers and higher functional polyisocyanates with more than two benzene rings in the molecule, characterised in that first the organic polyisocyanate mixture is separated by a short-path distillation into a fraction 1, which besides a residue of diphenyl-methane diisocyanate isomers, contains the higher functional polyisocyanates with more than two benzene rings in the molecule, and into a fraction 2, which of the polyisocyanates, contains practically only the diphenyl-methane-diisocyanate isomers, and then the fraction 2 is separated by fractional crystallisation into the fraction 3, which preferably has a content of at least 98% 4,4'-diphenyl-methane-diisocyanate, and the fraction 4, in which the 2,2'-and 2,4'-isomers of the diphenyl-methane-diisocyanate are enriched in the 4,4'-diphenyl-methane-diisocyanate.

15. Process according to claim 1 characterized in that prior to the reaction a synthetic resin dispersion, is added to one of the starting components.

16. Process according to claim 1 characterized in that said water glass solution is an aqueous sodium silicate solution of 48° to 50° Be.

17. Process according to claim 1 characterized in that the isocyanate component is an undistilled crude isocyanate product as obtained after phosgenation of crude aniline/formaldehyde resins.

18. Process according to claim 7 wherein the emulsifier is an alkylphenol oxyethylate having an oxethylating degree of 9 to 10.

* * * * *